United States Patent [19]

Hofmann

[11] Patent Number: 4,770,207

[45] Date of Patent: Sep. 13, 1988

[54] FLUIDIC SYSTEM

[75] Inventor: Manfred Hofmann, Altendiez, Fed. Rep. of Germany

[73] Assignee: Hydrotechnik GmbH, Fed. Rep. of Germany

[21] Appl. No.: 15,653

[22] Filed: Feb. 17, 1987

[30] Foreign Application Priority Data

Feb. 17, 1986 [EP] European Pat. Off. ...... 86 10 1980.0

[51] Int. Cl.$^4$ .................. F16L 31/28; F16L 37/00
[52] U.S. Cl. ..................... 137/557; 137/614.05; 73/40.5 R; 285/133.1; 285/137.1
[58] Field of Search ............ 137/557, 614.05; 73/40.5 R; 285/133.1, 137.1

[56] References Cited

U.S. PATENT DOCUMENTS

| | | | |
|---|---|---|---|
| 3,395,074 | 7/1968 | Doulet et al. | 73/40.5 R |
| 3,865,967 | 2/1975 | Pritchett | 73/40.5 R |
| 4,103,537 | 8/1978 | Victor | 73/40.5 |
| 4,253,488 | 3/1981 | Leverberg | 137/382 |
| 4,367,888 | 1/1983 | Leverberg et al. | 285/137.1 |
| 4,441,328 | 4/1984 | Brister | 73/40.5 R |
| 4,480,462 | 11/1984 | Miller | 73/40.5 |
| 4,486,060 | 12/1984 | Currall | 137/614.05 |
| 4,495,967 | 1/1985 | Needham et al. | 285/137.1 |

FOREIGN PATENT DOCUMENTS

| | | |
|---|---|---|
| 2537407 | 8/1975 | Fed. Rep. of Germany . |
| 2546442 | 10/1975 | Fed. Rep. of Germany . |
| 2725575 | 6/1977 | Fed. Rep. of Germany . |
| 2756084 | 6/1980 | Fed. Rep. of Germany . |

Primary Examiner—A. Michael Chambers
Attorney, Agent, or Firm—Robert J. Koch

[57] ABSTRACT

A high, reduced or alternating pressure fluid measuring system equipped with lines connected to measuring, control or regulating points combined in a collector. The collector is a rapid, multiple coupling and is actuable under operating pressures. The plug or socket is connected to a measuring device with sensors, control or regulating devices. The measuring device has a housing with plural bores, each to receive a pressure transducer and connected to a fluid and a vent channel. The fluid channel leads to a coupling bushing. The plug and socket housing have axially parallel bores to receive a coupling bushing, each with a radial clearance. A spring loaded mechanically actuated check valve and cylindrical valve body is located in each bushing. The outer edge or frontal surface of a bushing sealing shoulder presses against a gasket when closed. The coupling bushing or sealing bush located in the coupling bushing and the gasket form a sealable flow channel. Each plug piece mechanically actuable check valve has an axially displaceable, shackled, flying piston exhibiting a bore and an outlet nipple designed for opening the cylindrical valve body of the associated, mechanically actuable socket check valve and inlet nipple for opening the cylindrical valve body of the plug piece mechanically actuable check valve.

11 Claims, 4 Drawing Sheets

FLUIDIC SYSTEM

BACKGROUND OF THE INVENTION

1. Field of the Invention

The invention concerns a fluidic system with a measuring apparatus the fluid whereof is under high pressures of several hundred bar or under reduced and/or varying pressures, said apparatus being equipped with measuring, control and/or regulating lines, each connected with measuring, control and/or regulating points of system and combined in a collector device.

2. Description of The Related Technology

For the detection of operating pressures of fluidic media, for example measuring couplings for fluidic systems are known, consisting of a coupling which in the installed state is under line pressure and in the bore whereof a spring loaded and mechanically actuable check valve is located.

This type of measuring couplings serve for example to establish testing or measuring connections on pressure lines, wherein as a rule the coupling bushing is fixedly installed in the pressure line of a fluidic system. For the duration of the testing or measuring operation, a sealing nipple in the form of a hollow plug is screwed on by means of a union nut, said nipple being fixedly connected with a hose. The couplings may be connected for example under pressure, i.e. without shutting down the installation, by means of measuring hose with the corresponding measuring instruments. In case of the connection of fixedly installed instruments, for example manometers, selective manometer switches, electric pressure transducers and pressure switches, the flexible measuring lines may be installed in the manner of electric cables, so that the expensive installation of pipes may be avoided. By means of such measuring couplings therefore effective operating pressures may be measured directly in the fluid lines, without the need for the loosening of vent screws and screwed pipe fittings. Couplings of this type are used with a great variety of structural elements and controls of fluidic systems. Following the separation of the coupling connection, the coupling bushing a protective cap is screwed onto the external threads of the bushing in order to prevent the penetration of dirt into the coupling bushing and to perform an additional sealing function in case a check valve installed in the coupling bushing is not absolutely tight.

Valve couplings of this type are known for example from DE No. 2 756 084, in which the valve bodies are in the form of cones or balls. In this known valve coupling the valve body is arranged in the form of a check valve on a compression spring and is displaceable by the latter, while comprising a flow channel on an upper contact end. The valve coupling is equipped with a sealing and antirotation ring, the sealing function of which is, however, assured only if a corresponding hose or closure cap is screwed tightly onto the coupling bushing with its sealing nipple.

If this cap is loosened or if it is not present at all—as for example in the case of selective manometer switches—the pressure medium is sealed in only by the corresponding check valve. However, due to its layout, any check valve for use in high pressure valve couplings of the aforementioned type will leak to a lesser or greater extent depending on the viscosity of the pressure medium, or cannot be manufactured in mass production so a to be tight in actual use.

For hose installation intended for use in general hydraulics and for gas feeder devices of hydraulic reservoirs such designs are adequate, but complaints concerning leakages already appear for example if caps of several valve couplings are loosened simultaneously in order to test with one measuring device several measuring locations in succession, if gas pressure testing devices are used on hydraulic reservoirs without gas refill possibilities, or if the valve couplings are used to monitor installations with combustible gases, etc.

The devices cannot be used at all with selective manometer switches in view of the constant leakage of the connections not actually in use. Attempts have already been made to in the case of the aforementioned valve couplings to equipped the check valve with rubber elastic gaskets or conventional O rings, but in spite of the initially adequate tightness, positive results were not achieved in all cases. With long measuring lines and high dead volumes in the manometers or the circulations connected and in particular with low viscosity liquids or high operating pressures, or in the case of test devices for hydraulic reservoirs, rubber elastic gaskets are washed out, as the high pressure difference upon the raising of the valve generates a very strong flow of the medium used at the seal.

For these reasons a valve couplings, preferably a measuring valve coupling, suitable for fluidic systems with high operating pressures and media with different viscosities, has already been proposed. Measures were provided to protect the seal, which consists of an elastomeric material against cavitation and washouts and to eliminate the effect of large volumes in the measuring line or the like, or the circulation connected on the elastomeric seal, by causing in a valve coupling a cylindrical valve body to press with the outer edge and/or frontal surface of its sealing shoulder in the closed state of the valve against a gasket consisting of an elastomeric material, and forming with a coupling bushing or a sealing bush located in the coupling bush a sealable flow channel, while further seals are provided downstream and/or upstream from said gasket, which upon the opening of the valve body terminate their sealing function only following the lifting of the gasket from the sealing shoulder, preferably in a delayed manner. This measure assures that the flow generated by the high pressure difference is throttled immediately after the release of the elastomeric gasket from its valve shoulder or is nearly arrested.

The decrease of the sealing function of the seals located downstream and/or upstream from the gasket during the forcing open of the valve body takes compared to the decrease in the sealing function of the gasket, over a longer stroke path. In this manner the seals located downstream and/or upstream from the gasket are still applying their sealing function, while due to its shorter stroke path, the gasket avoids the flow that otherwise would be generated, together with the cavitation or washout to which it would be exposed.

The use of hydraulic installations in combination with other system components and electrohydraulic elements requires in case of a failure or malfunction a rapid and accurate diagnosis, so that the state of certain groups of structural elements may be determined immediately. This requires the availability of the measured pressure date of as many components of the system as possible within a short period of time, preferably simultaneously. The aforedescribed measuring couplings are especially suitable for the purpose. They are installed at strategically important measuring locations of an installation and are optionally combined on an orifice plate by means of measuring lines. To actually perform the measurements, the high pressure lines must be connected individually with single measuring points. Confusion of the connections often occur during the connection process so that false measurements are carried out. Furthermore, the measuring devices connected may be damaged or destroyed, is the measured values being detected are not within the measuring range of the device.

Multiple couplings are also known, but these may be actuated manually only in case of low system pressures. In systems with high pressures, the coupling process may be carried out mechanically only, or else the system must be depressurized prior to the coupling operation.

SUMMARY OF THE INVENTION

It is the object of the invention to provide a fluidic system in combination with a measuring apparatus, wherein measuring, control and/or regulating lines are fixedly installed at the corresponding points of the system and are leading to a collector device, and wherein single coupling are utilized and developed into a multiple coupling, in order to transmit the pressures detected over a multiple line, so that the measurements—acquired at different points of the system—may be carried out in a central location and if necessary, simultaneously.

It is a further object of the invention to provide a measuring system wherein a plurality of sensors, preferably pressure transducers, are connected by means of a single coupling process, with the associated measuring locations or measuring points of the system.

This object is attained by that according to the invention the collector apparatus is in the form of a multiple rapid action coupling actuable under operating pressures, with a socket and a plug part, and that the further conducting plug or socket piece is connected with a measuring apparatus comprising a plurality of sensors and/or with control and/or regulating devices.

In a further development of the invention the measuring apparatus comprises a housing provided with a plurality of bores, each to receive a pressure transducer housing, with each bore being connected with a fluid channel and a venting channel and with the fluid channel leading to a coupling bushing of the socket or plug piece.

According to the invention, each of the pressure transducers forms with the housing a sealed pressure transducer chamber having a small volume.

The pressure transducer chamber advantageously comprises a venting device with a vent screw located at the outlet of the vent channel, which is connected fluidically with the pressure transducer chamber of the pressure transducer.

The pressure transducer further comprises electrical connections leading to a connecting block on the outside. The further object is attained by means of a multiple rapid action coupling by that according to the invention both the plug and the socket piece comprise a housing with several axially parallel bores, each of which is to receive a coupling bushing with a radial clearance and that in each coupling bushing a spring loaded and mechanically actuable check valve with a cylindrical valve body is arranged, said valve body pressing with the outer edge and/or the frontal surface of its sealing shoulder in the closed state of the valve against a gasket forming with the coupling bushing or a sealing bush located in the coupling bushing, a sealable flow channel, and by that each check valve of the plug piece comprises a shackled flying piston provided with a passage bore, with the outlet nipple of said piston being designed so as to force open the cylindrical valve body of the associated, mechanically actuable check valve of the socket piece, and the inlet nipple whereof is designed to force open the valve body of the check valve of the plug piece.

In a further development of the invention, the flying piston has an outer stop shoulder to limit its penetration into the associated valve of the socket piece and an inner stop shoulder to limit the depth of penetration into the valve following it, wherein each bore in the housing of the socket piece on the outlet side is provided with a recess to limit the axial movement of the flying piston.

In each check valve of the socket and the plug piece further flow channel seals are located downstream and/or upstream from the gasket consisting of an elastomeric gasket, which upon the forcing open of the valve body by the inlet or outlet nipple of the piston terminate their sealing function during the coupling process only after the lifting of the gasket from the sealing shoulder, preferably in a delayed manner.

In an advantageous manner, each coupling bushing comprises on its outlet side a retainer ring abutting against a shoulder of a hose nipple and being held by a single or multiple part perforated disk clamped by screwing.

The housing of the socket piece and its perforated disk are provided with a center bore, wherein a centering pin is located to center the perforated disk.

The perforated disk of the plug piece has a center bore in which a clamping bolt is located for clamping in the perforated disk and which it is equipped with a threading and centering pin projecting from the housing of the plug piece.

The frontal side of the housing of the socket and the plug piece comprise radically acting coding pins engaging during the coupling process a plurality of defined coding bores.

In an advantageous manner, the centering pin is protruding farther out than the coding pins from the housing of the plug piece.

The invention will be explained in more detail with reference to the figures. In the drawings:

BRIEF DESCRIPTION OF THE DRAWING

In the different figures like elements are provided with like reference symbols, while similar elements are designated by the same numbers and with indices.

DETAILED DESCRIPTION OF THE PREFERRED EMBODIMENT

Figure 1:
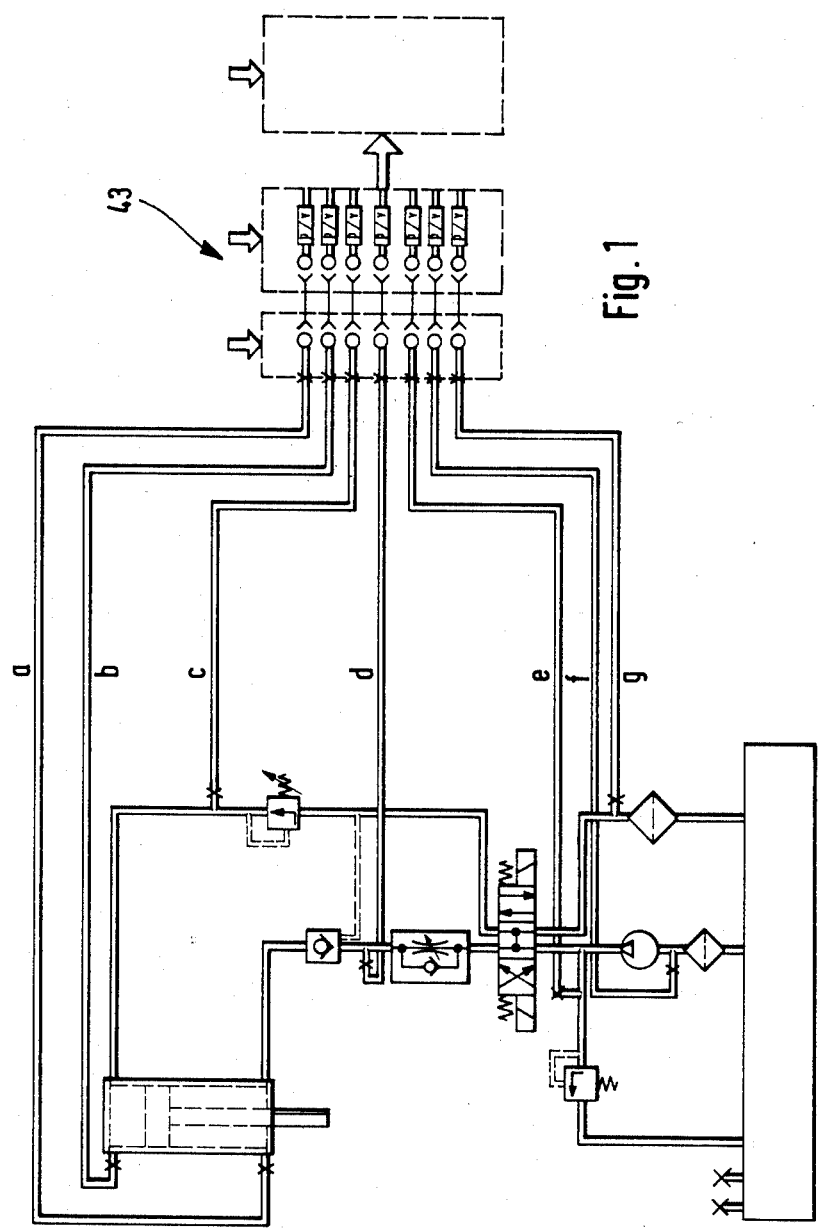
FIG. 1 shows the circuit diagram of a fluidic installations with fluid lines, brought together in a collector device with a measuring apparatus.

FIG. 1 shows a circuit diagram of a fluidic installation with fluid lines as an example of the embodiment of the invention. In this case a leakage testing apparatus with a test cylinder and additional elements to be tested and monitored. The fluid lines a, b, c, d, e, f and g are connected with the individual elements of the fluidic installation and lead to a common collector device 43 consisting of a socket and a plug piece, to be described in more detail below. One group of connecting lines of the plug piece is connected directly with a measuring apparatus in an integral manner, while another group of fluid connecting lines or electrical conductors are passed from the measuring apparatus to a remote measuring, control or regulating device. The collector device with the multiple rapid action coupling and the integrated measuring apparatus make possible all of the variants addressed. The fluidic installation may be any plant equipped for example with hydraulics. These may be mobile or stationary plants. The mobile plants include earth moving devices such as baggers, ram devices, further wheeled or tracked transport vehicles, lifting vehicles or the like.

The fluidic medium also may consist of different materials, i.e. one line or a group of lines may carry a hydraulic oil, while another line or group of lines may contain compressed air. The multiple rapid action coupling, which is part of the collector device 43, may contain simultaneously high pressures of several hundred bar or reduced and/or varying pressures.

Figure 2:
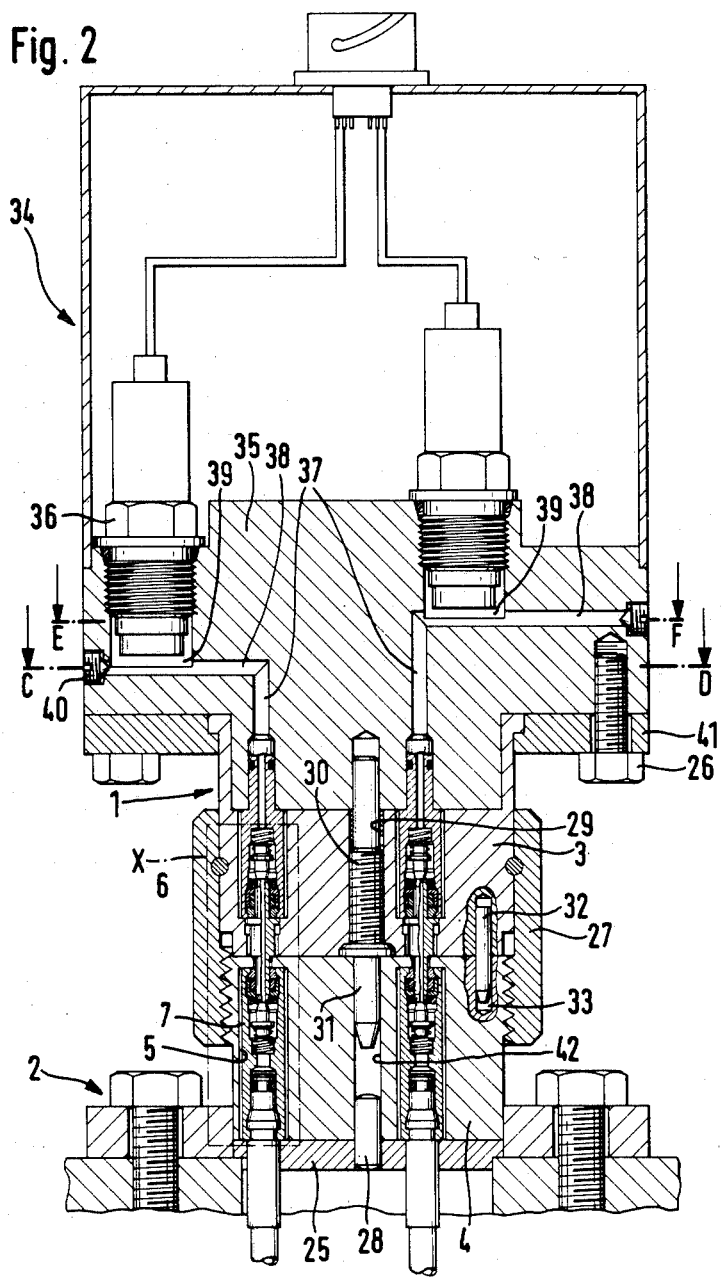
FIG. 2 a longitudinal section through a plug piece with an integrally connected measuring device and a socket piece coupled with the plug piece.

FIG. 2 shows the multiple rapid action coupling actuable under operating pressure, laid out with a socket and a plug piece 2 and 1. The continuing plug or socket piece 2 or 1 is connected with a measuring apparatus 34 comprising a plurality of sensors. Corresponding connecting lines may also be passed to further measuring, control and/or regulating devices, not shown.

The measuring apparatus 34 comprises a housing 35 provided with a plurality of bores, each to receive a pressure transducer 36. To establish the fluid connection, each bore is provided with a fluid channel 37 and a vent channel 38, at the end of which the vent screw 40 is located. The fluid channel 37 leads to a coupling bushing 7 of the socket or plug 2 or 1. Each pressure sensor forms with the housing 35 a sealed pressure transducer chamber 29 having a relatively small volume.

The pressure transducer 36, which in a known manner may be in the form of a semiconductor element with an integrated amplifier circuit and optionally with a temperature compensator and compensator circuit, comprises electric connections leading on the outside to a connecting block, not shown.

The housing 35 provided with a plurality of bores, is in the form of the socket piece 1 of the multiple rapid action coupling. However, the housing 35 may alternatively also be designed as the plug part.

Figure 3:
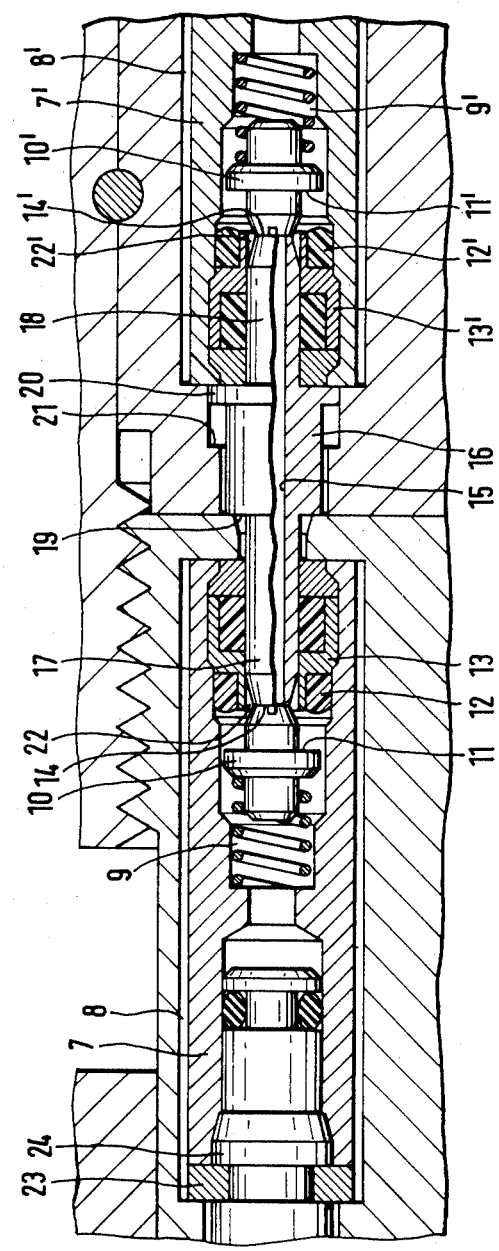
FIG. 3 an enlarged view of a segment designated in FIG. 1 by X.

FIG. 2 shows a plug piece 1 coupled with a socket piece 2. FIG. 3 shows an enlarged segment X of FIG. 2. Reference is therefore made as this time to FIG. 3 also.

The plug part 1 has a housing 3 and the socket piece 2 comprises a housing 4 in a similar manner. Both housings 3 and 4 are provided with several axially parallel bores 5 and 6, each to receive a coupling bushing 7 or 7', with a radial clearance 8 and 8'. The coupling bushings 7' of the plug part 1 are similar in their configuration to the coupling bushings 7 of the socket piece 2, so that the coupling bushing 7 in the socket piece 2 will be described first.

In each of the coupling bushings 7 a spring loaded and mechanically actuable check valve 9 with a cylindrical valve body 10 is located. The valve body 10 is pressing with the outer edge and/or the frontal surface of its sealing shoulder 11 in the closed state of the valve against a gasket 12, which together with the coupling bushing 7 or a sealing bush 13 located in the coupling bushing 7, a sealable flow channel 14.

Identical elements are located in the coupling bushings 7' of the plug pieces 1. However, every mechanically actuable check valve 9' of the plug piece 1 comprises a shackled flying piston 16 provided with a passage bore 15, with the outlet nipple 17 of said piston being designed to force open the cylindrical valve body 10 of the mechanically actuable check valve 9 of the socket piece 2 associated with it, and the inlet nipple 18 designed to force open the cylindrical valve body 10' of the mechanically actuable check valve 9' of the plug piece 1.

The flying piston 16 is provided with an outer stop shoulder 19 to limit its depth of penetration into the mechanically actuable check valve 9 of the socket piece 2 associated with it.

The flying piston is further provided with an inner stop shoulder 20 to limit its depth of penetration into the mechanically actuable check valve 9' of the plug part 1 following it. Each bore 5 in the housing of the plug part 1 is provided on the outside with a recess 21 to limit the axial motion of the flying piston 16.

In each of the mechanically actuable check valves 9 and 9' of the socket and the plug piece 2 and 1, downstream and/or upstream of the gasket 12 and 12' a further flow channel seal 22 and 22' is located, which upon the opening of the cylindrical valve body 10 and 10' by the inlet or outlet nipple 18 and 17 of the flying piston 16 during the coupling process terminates its sealing function after the lifting of the gasket 12 and 12' from the sealing shoulder 11 and 11' only, preferably in a delayed manner.

Each coupling bushing 7 is equipped on the outlet side with a retainer ring 23, which abuts against a collar 24 of the corresponding hose nipple and is being held by a single or multiple perforated disk secured by screwing. In a corresponding manner, the housing 35 is clamped tight with the perforated disk 41 by means of the bolt 26.

The housing 4 of the socket piece 2 and its perforated disk 25 are provided with a center bore 42, wherein the centering pin 28 for the centering of the perforated disk 25 is located.

The housing 3 of the plug piece 1 is provided with a center bore 29, wherein a clamping bolt 30 is located for the clamping of the housing 35, said bolt being equipped with a threading and centering pin 31 protruding from the housing of the plug piece 1. In the joint state, the centering pin 31 of the plug piece 1 extends into the bore 42 of the socket piece 2, whereby the threading and centering process is completed.

In order to obtain this, the centering pin 31 is projecting further from the housing 3 of the plug piece 1 than the coding pins 32 providing correct radial coordination and described below.

To secure the radial coordination of the plug piece with the socket piece, the frontal sides of the housing 3 and 4 of the socket and plug piece 1 and 2 are equipped with radially acting coding pieces 32, which during the coupling process engage the defined coding bores 33.

The plug piece 1 is further equipped with a rotatably supported threaded sleeve 27 with internal threading and the outside of the housing 4 of the socket piece 2 is provided with threading engaging the said internal threading of the threaded sleeve 27.

The rotatably supported threaded sleeve 27 further comprises a radially oriented wing on its circumference for better manipulation.

As seen in FIG. 3, the upper frontal surface or the outer edge of the sealing shoulder 10 and 10' is pressing in the closed state of the valve against the gasket 12 and 12', said gaskets being made of an elastomeric material. Downstream from the gasket 12 and 12' the valve body 10 and 10' forms together with an annular projection of the sealing bush 13, 13' a seal in the shape of a throttling path.

If the valve body 10 is forced open by means of the outlet nipple 17 of the flying piston 16, the gasket 12 lifts off the sealing shoulder of the valve body 10, while the seal in the form of a throttling path maintains its sealing function, until the annular projection of the sealing bush 13 leaves the conical upper part of the valve body 10. The inlet nipple 18 of the flying piston 16 is acting in a similar manner on the valve body 10'. The prevention of a flow or the reduction of the velocity of the medium flowing past the flow channel seal 22 results in the avoidance of a washout or cavitation of the seal. Consequently, the entire sealing system is suitable for use at extremely high temperatures and also with gases, wherein the by means of the coordination and layout of the different seals an extremely long life is assured.

Figure 4:
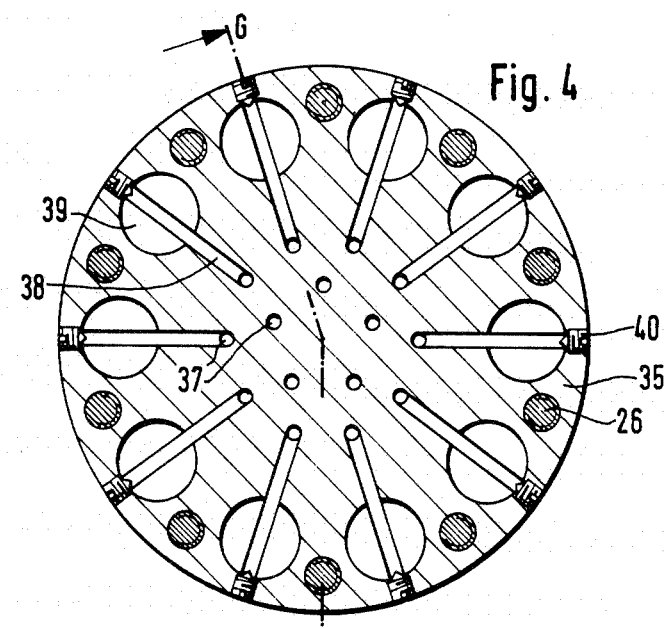
FIG. 4 a section on the line C-D in FIG. 2.
Figure 5:
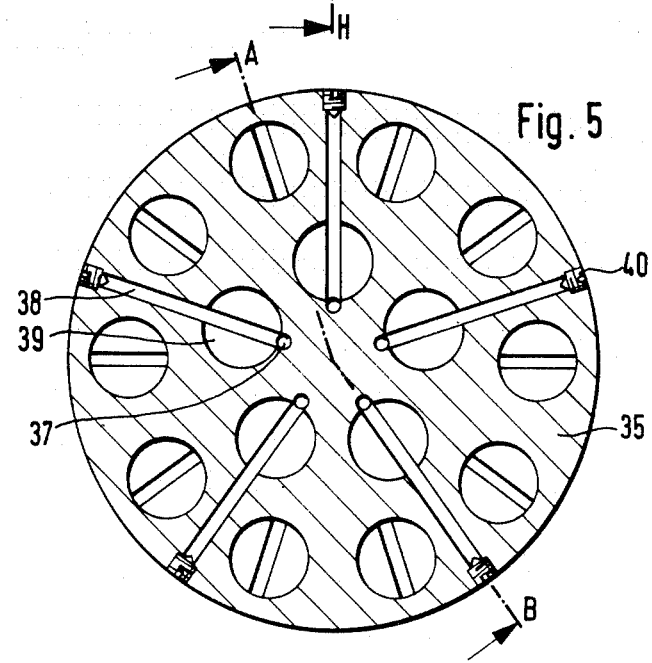
FIG. 5 a section on the line E-F in FIG. 2.

The sectional views of FIGS. 4 and 5 are intended to further visualize the invention with the sections C-D and E-F of FIG. 2.

The invention now makes it possible to conduct a plurality of measuring, control or regulating lines of a fluidic system by means of a group of lines equipped with a plug-in coupling, to a pressure measuring device or the like, integrally connected with said plug-in coupling, and to a subsequent measuring, control or regulating apparatus, so that the measuring or control values may be processed centrally. With a single manually actuable coupling process, by means of the invention all of the fluidic measuring locations of the system may be connected in the correct correlation with their measuring devices, simultaneously and under the prevailing operating pressure. It is not necessary therefore to shut down the system to connect the measuring devices, but the measurement may be carried out immediately following the joining process of the multiple rapid action coupling. No confusion of a connection with an associated measuring or control device is possible so that no false measurements or even destruction of instruments could occur.

I claim:

1. A multiple point fluid measuring system for simultaneous detection and measuring of high, reduced, and alternating pressures comprising measuring, control and regulating lines, each connected to respective measuring, control or regulating points and to an integrated measuring apparatus exhibiting a plurality of sensors and a multiple rapid action coupling with a socket and a plug part;

said plug part and socket part each exhibit a housing with a plurality of axially parallel bores;

a coupling bushing received in each bore with a predetermined radial clearance;

a check valve arranged in each coupling bushing exhibiting a cylindrical valve body;

a flow channel through said coupling bushing defined by a packing bushing and a gasket arranged in said coupling bushing wherein a sealing shoulder of said check valve is biased against said gasket;

a shackled flying piston with an axial flow channel and an inner annular stopping shoulder displaceably arranged in said plug part parallel bores, exhibiting an outlet nipple disposed against and arranged to open a corresponding socket part valve body and an opposing inlet nipple disposed against and arranged to open a corresponding plug part valve body when said plug and socket parts are in a coupled configuration;

a second seal between said cylindrical valve bodies and respective packing bushings configured for delayed release by respective inlet and outlet nipples of said piston during a coupling procedure after release of a seal between said sealing shoulder and said gasket by action of said piston against corresponding cylindrical valve bodies.

2. A system according to claim 1, wherein said measuring apparatus further comprises a housing portion provided with a plurality of bores, each to receive a pressure transducer and connected with a fluid channel and a vent channel, wherein said fluid channel leads to an associated coupling bushing of the socket or plug piece.

3. A system according to claim 2, wherein each pressure transducer and the housing defines a sealed small volume pressure transducer chamber.

4. A system according to claim 3 wherein said pressure transducer chamber includes a venting device comprising a vent screw located at an outlet of a respective vent channel fluidly connected to the pressure transducer chamber of the pressure transducer.

5. A system according to claim 4 wherein said pressure transducer exhibits electrical connections leading to an external connecting block.

6. A system according to claim 5 wherein said flying piston further comprises an outer stop shoulder arranged to limit depth of penetration into the associated mechanically actuable check valve of the socket part and said inner annular stop shoulder arranged to limit depth of penetration into the check valve of the plug part and wherein each bore in the housing of the plug part is provided with a recess to limit axial movement of the flying piston on an outlet side.

7. A system according to claim 1 wherein each coupling bushing further comprises a retainer ring abutting against a collar of a hose nipple and held by a single or multiple part perforated disk secured by screwing on an outlet side.

8. A system according to claim 7 wherein said housing of the socket part and its perforated disk comprise a center bore, and a centering pin for the centering of the perforated disk located in said enter bore.

9. A system according to claim 8 wherein said plug part housing comprises a threaded center bore, and a bolt exhibiting a threading and centering pin located in and protruding from the housing of the plug part.

10. A system according to claim 9 wherein frontal sides of said socket and plug part housing exhibit radially acting coding pins aligned to engage with defined coding bores during coupling.

11. A system according to claim 10 wherein said centering pin protrudes further then the coding pins from the housing of the plug part.

* * * * *